B. E. Chollar: Purifying Tray.

PATENTED DEC 24 1867

No. 72455

Witnesses:
Theo. Insche
W. Trewin

Inventor:
B. E. Chollar
Per Munn & Co.
Attorneys

United States Patent Office.

B. E. CHOLLAR, OF LEAVENWORTH, KANSAS.

Letters Patent No. 72,455, dated December 24, 1867.

IMPROVEMENT IN TRAYS FOR GAS-PURIFIERS.

*The Schedule referred to in these Letters Patent and making part of the same.*

TO ALL WHOM IT MAY CONCERN:

Be it known that I, B. E. CHOLLAR, of Leavenworth city, in the county of Leavenworth, and State of Kansas, have invented a new and improved Purifying-Tray; and I do hereby declare that the following is a full, clear, and exact description thereof, which will enable those skilled in the art to make and use the same, reference being had to the accompanying plate of drawings, forming part of this specification.

This invention relates to a new and improved method of constructing purifying-trays for gas-works, whereby the same are more cheap and durable, and are more easily cleansed and repaired.

The invention consists of pectinated bars, of any desired form, forming the ends of the tray. In the spaces between the teeth in said bars, grate-bars are placed, and the same are held in position by other bars or clamps, which said clamps are bolted down upon said grate-bars. In the accompanying plate of drawings—

Similar letters of reference indicate corresponding parts.

Figure 1:
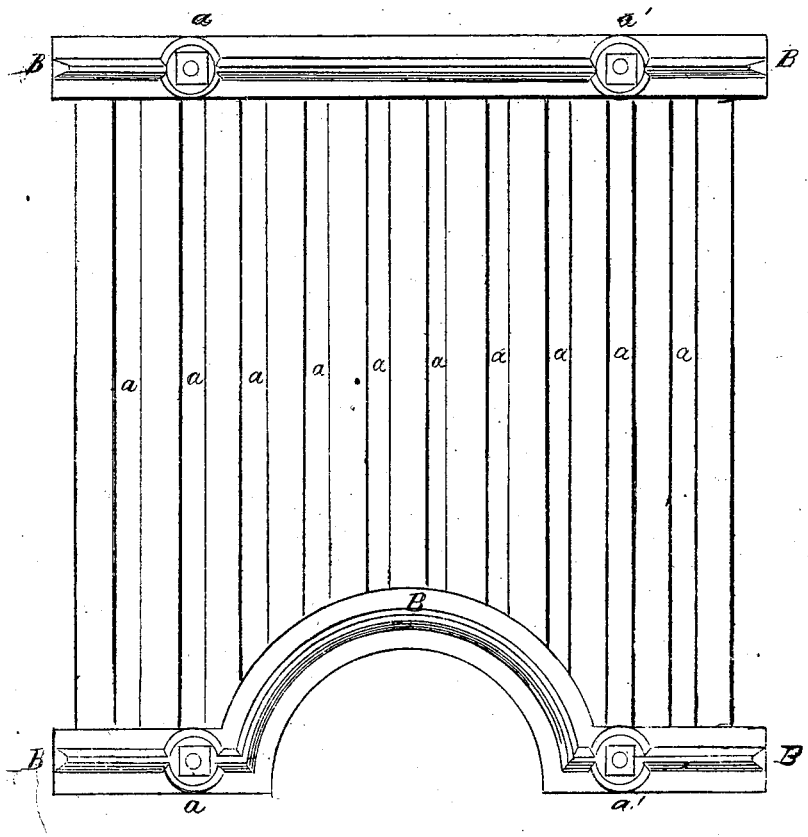
Figure 1 represents a plan view of my invention.
Figure 2:
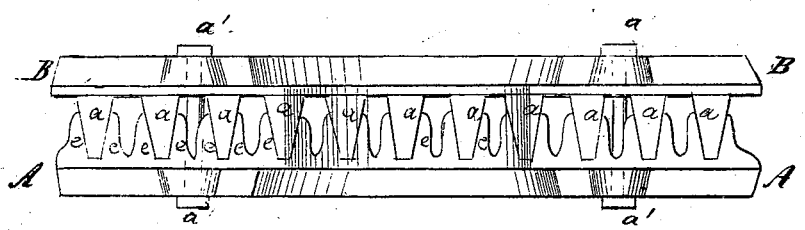
Figure 2 represents an end view of the same.

A are the pectinated bars, having the teeth $e$; B are the clamps; $a$ are the grate-bars; $a'$ are the bolts, by means of which the grate-bars are held down. The pectinated bars A, which, with the clamp or binder B, and the bolts $a'$, form the ends of the tray, are made either straight or of any desired form, as shown in fig. 1, having spaces between the teeth in the same, either in the form of a V, as shown in the drawing, fig. 2, or of any other form to receive the bars $a$. The bars $a$ are grate-bars, of any required shape, and of suitable length, and in any required number. Said bars $a$ are placed in the spaces between the teeth $e$, as shown in the drawing, fig. 2, so as to extend from one to the other of the pectinated bars A, so as to form a grate. Upon said bars $a$ is placed the binder or clamp B, having a form corresponding to the form of the pectinated bars A. Through said bars A, and said clamps B, at convenient distances apart, and between two of the grate-bars $a$, pass the screw-bolts $a'$, by means of which the clamps or binders B are drawn down upon the grate-bars $a$ in the pectinated bars A, and are thus held firmly in position.

Constructed as above described, my invention forms a neat and convenient purifying-tray for gas-works, the advantages of which are that any one or all of said bars, $a$, may be removed, when, for purposes of cleaning or repairs, it becomes necessary to do so, and the same is cheaper and more durable than the purifying-trays now in use.

Having thus described my invention, I claim as new, and desire to secure by Letters Patent—

1. A purifying-tray, substantially as shown and described, and for the purpose set forth.

2. The grate-bars $a$, in combination with the pectinated bars A and the binders or clamps B, substantially as shown and described, and for the purpose set forth.

B. E. CHOLLAR.

Witnesses:
  GEO. F. EBERHARDT,
  HARVEY W. GOFF.